US012633595B2

(12) United States Patent
Zhu et al.

(10) Patent No.: US 12,633,595 B2
(45) Date of Patent: May 19, 2026

(54) BATTERY ASSEMBLY, BATTERY MODULE AND BATTERY ENERGY STORAGE DEVICE

(71) Applicant: SAIC MOTOR CORPORATION LIMITED, Shanghai (CN)

(72) Inventors: Jun Zhu, Shanghai (CN); Kewei Lu, Shanghai (CN); Dingxian Zhou, Shanghai (CN); Yaqi Chen, Shanghai (CN); Haiping Chen, Shanghai (CN); Shuyuan Liu, Shanghai (CN); Zhao Li, Shanghai (CN); Xunwen Cao, Shanghai (CN); Fengyi Chen, Shanghai (CN)

(73) Assignee: SAIC MOTOR CORPORATION LIMITED, Shanghai (CN)

( * ) Notice: Subject to any disclaimer, the term of this patent is extended or adjusted under 35 U.S.C. 154(b) by 1021 days.

(21) Appl. No.: 17/781,883

(22) PCT Filed: Dec. 3, 2019

(86) PCT No.: PCT/CN2019/122722
§ 371 (c)(1),
(2) Date: Jun. 2, 2022

(87) PCT Pub. No.: WO2021/108989
PCT Pub. Date: Jun. 10, 2021

(65) Prior Publication Data
US 2023/0012679 A1    Jan. 19, 2023

(51) Int. Cl.
H01M 10/658 (2014.01)
H01M 10/6551 (2014.01)
(Continued)

(52) U.S. Cl.
CPC ..... H01M 10/658 (2015.04); H01M 10/6551 (2015.04); H01M 50/30 (2021.01);
(Continued)

(58) Field of Classification Search
CPC ........... H01M 10/613; H01M 10/6551; H01M 10/656; H01M 10/658; H01M 50/204;
(Continued)

(56) References Cited

U.S. PATENT DOCUMENTS

2004/0201366 A1* 10/2004 Kimoto ............... H01M 10/613
320/150
2010/0136396 A1 6/2010 Hermann et al.
(Continued)

FOREIGN PATENT DOCUMENTS

CN         107579177 A        1/2018
CN         206992202 U        2/2018
(Continued)

OTHER PUBLICATIONS

International Search Report in International Patent Application No. PCT/CN2019/122722, mailed Feb. 8, 2020.
(Continued)

*Primary Examiner* — Lingwen R Zeng
(74) *Attorney, Agent, or Firm* — NIXON PEABODY LLP

(57) ABSTRACT

The embodiments of the present application provide a battery assembly, a battery module and a battery energy storage device. The battery assembly 10 comprises: a heat insulation fixing frame 101, a top isolation plate 102 and at least one cell 103; the heat insulation fixing frame 101 surrounds the at least one cell 103 to fix the position of the at least one cell 103; the cell 103 comprises a cell main body 1031, an electrode 1032 and a cell pressure relief valve 1033, the cell pressure relief valve 1033 being used for releasing flue gas; the top isolation plate 102 is mounted on the top of the heat insulation fixing frame 101 and is attached to the top of the heat insulation fixing frame 101; at least one first flue gas channel 1021 is provided on the top isolation plate 102; the first flue gas channel 1021 is used for
(Continued)

discharging flue gas; the position of the first flue gas channel 1021 is opposite to the position of the cell pressure relief valve 1033; and the top isolation plate 102 is provided with at least one first electrode through hole 1022, so that the electrode 1032 is electrically connected through the first electrode through hole 1022. Therefore, the potential safety hazard during thermal runaway of the cell is reduced.

20 Claims, 9 Drawing Sheets

(51) Int. Cl.

| | | |
|---|---|---|
| *H01M 50/30* | (2021.01) | |
| *H01M 10/613* | (2014.01) | |
| *H01M 10/656* | (2014.01) | |
| *H01M 50/204* | (2021.01) | |
| *H01M 50/289* | (2021.01) | |
| *H01M 50/358* | (2021.01) | |

(52) U.S. Cl.
CPC ........ *H01M 10/613* (2015.04); *H01M 10/656* (2015.04); *H01M 50/204* (2021.01); *H01M 50/289* (2021.01); *H01M 50/358* (2021.01); *Y02E 60/10* (2013.01)

(58) Field of Classification Search
CPC .. H01M 50/289; H01M 50/30; H01M 50/358; Y02E 60/10
See application file for complete search history.

(56) References Cited

U.S. PATENT DOCUMENTS

| | | | | |
|---|---|---|---|---|
| 2020/0328389 A1* | 10/2020 | Lloyd | ................. | H01M 50/284 |
| 2021/0074971 A1* | 3/2021 | Kim | ................... | H01M 50/383 |

FOREIGN PATENT DOCUMENTS

| | | |
|---|---|---|
| CN | 110197935 A | 9/2019 |
| CN | 110444835 A | 11/2019 |
| EP | 3547397 A2 | 10/2019 |

OTHER PUBLICATIONS

Written Opinion in International Patent Application No. PCT/CN2019/122722 mailed Feb. 8, 2020.
European search report for Application No. 19955392.6, mailed Aug. 9, 2023.

* cited by examiner

104

102

105

103 potting
adhesive

103

107

104 102

103 105

107

103

3031

3033

3032

30

301

304

30111

BATTERY ASSEMBLY, BATTERY MODULE AND BATTERY ENERGY STORAGE DEVICE

CROSS-REFERENCE TO RELATED APPLICATIONS

This application is the United States National Phase of International Application No.: PCT/CN2019/122722, filed Dec. 3, 2019, the entire contents of which are herein incorporated by reference in their entirety.

TECHNICAL FIELD

The present application with its embodiments relates to the field of battery technology, and in particular to battery assemblies, battery modules and battery energy storage devices.

BACKGROUND

With increasing demand for carrying power in various new energy vehicles and the development of battery storage industry, the energy densities of various batteries such as lithium-ion batteries have been increasing, requiring more on safety, cost, and power integration efficiency for battery storage technology. In a related technology, a number of cells are integrated together to be used as a battery module. If the thermal runaway of the cell arises, the cell rapidly heats up and generates a large amount of heat, and eject materials in a manner of solid-liquid-gas three-phase coexistence of fume ejected from the cell unit. The remaining heat of the cell is transferred to the neighboring cells to heat them up rapidly, resulting in the thermal runaway spreading out among the cells and safety hazards taking place.

SUMMARY

In view of the above, one of the technical problems solved by embodiments of the present application is to provide a battery assembly, a battery module and a battery energy storage device for overcoming all or part of the above problems.

At a first aspect, an embodiment of the present application provides a battery assembly comprising a thermal insulating and fastening frame, a top insulating plate, and at least one cell;

the thermal insulating and fastening frame surrounding the at least one cell to fix the position of the at least one cell;

the cell comprising a cell body, an electrode, and a cell pressure relief valve, the cell pressure relief valve being used to discharge fume;

the top insulating plate being mounted on the top of the thermal insulating and fastening frame, and fitting to the top of the thermal insulating and fastening frame, the top insulating plate being provided with at least one first fume passage, the first fume passage being used to discharge fume, the first fume passage being positioned opposite to the position of the cell pressure relief valve; the top insulating plate being provided with at least one first electrode through-hole in order that the electrode is electrically connected through the first electrode through-hole.

Optionally, in an embodiment of the present application, the top insulating plate is provided with at least one convex rib, the convex rib facing towards the thermal insulating and fastening frame, insulating the tops of the adjacent cells from each other.

Optionally, in an embodiment of the present application, the battery assembly further comprises a top shielding plate, the top shielding plate being mounted on the top of the thermal insulating and fastening frame, the top shielding plate being provided with at least one second fume passage, the second fume passage being used for discharging fume, the second fume passage being positioned opposite to the first fume passage, the top shielding plate being fitted to the top of the cell, the top insulating plate being fitted to the top shielding plate, the top shielding plate being provided with at least one second electrode through-hole in order that the electrode is electrically connected through the second electrode through-hole.

Optionally, in an embodiment of the present application, the battery assembly further comprises a fume-insulating strip, the fume-insulating strip being mounted on the side face of the battery assembly.

Optionally, in an embodiment of the present application, the battery assembly further comprises an electrical connecting sheet, the electrical connecting sheet being mounted above the top insulating plate, the electrode of the cell being electrically connected through the electrical connecting sheet.

Optionally, in an embodiment of the present application, the battery assembly further comprises at least one thermal insulating sheet, the thermal insulating sheet being provided between the side walls of the cell.

Optionally, in an embodiment of the present application, the battery assembly further comprises a base plate, the base plate being provided at the bottom of the battery assembly, the base plate being fixedly connected to the thermal insulating and fastening frame to form a cavity to accommodate at least one cell.

At a second aspect, the present application provides a battery module comprising at least one battery assembly as described as the first aspect or any embodiments of the first aspect;

the battery module further comprising a radiator frame, the radiator frame being mounted with a single side, or at least one battery assembly being mounted on each side of the radiator frame in order that the battery assembly dissipates heat through the radiator frame;

the bottom face of the battery assembly being provided opposite to the radiator frame, and the bottom face of the cell of the battery assembly being fitted to the radiator frame.

Optionally, in an embodiment of the present application, the radiator frame is provided with a convex rib at a position corresponding to the thermal insulating and fastening frame, and wherein the convex rib of the radiator frame fits to or leaves a gap with the lower edge of the thermal insulating and fastening frame.

Optionally, in an embodiment of the present application, the radiator frame is provided with a cooling runner therein, the cooling runner being used to accommodate a coolant.

At a third aspect, the present application provides a battery energy storage device comprising at least one battery module as described as the second aspect or any embodiments of the second aspect.

Optionally, in an embodiment of the present application, the battery energy storage device further comprises a housing and a fume insulating and guiding plate;

the housing being provided with a third fume passage, the fume insulating and guiding plate being provided between two battery modules, the top of the two the battery modules facing towards the fume insulating and guiding plate and having a gap with the fume insulating and guiding plate such that the fume passing through the first fume passage through the top insulating plate of the battery modules and being discharged from the third fume passage along the fume insulating and guiding plate.

Optionally, in an embodiment of the present application, the third fume passage comprises an outer hole, an inner hole and a connecting channel; the inner hole being provided in the inner wall of the housing, the outer hole being provided in the outer wall, the position of the inner hole being displaced to the position of the outer hole, the inner hole and the outer hole being connected with each other through the connecting channel.

Optionally, in an embodiment of the present application, the housing comprises a top cover, a bottom cover, two first side beams and two second side beams; the top cover, the bottom cover, the two first side beams and the two second side beams being fixedly connected together to form a cavity accommodating at least one battery module.

Optionally, in an embodiment of the present application, the top cover and the bottom cover are opposed to the two first sides of the battery module respectively; the first side beams and the second side beams being opposed to two second sides of the battery module respectively, the first sides having areas larger than those of the second sides; the second side beams being opposed to the bottom of the battery module respectively.

For the battery assembly, the battery module and the battery energy storage device of embodiments of the present application, with the top insulating plate and thermal insulating and fastening frame are provided in the battery assembly, in case of a thermal runaway, the fume in the cell, after being discharged from the cell through the cell pressure relief valve on the cell, cannot enter other cells due to the top insulating plate and the thermal insulating and fastening frame, and is discharged through the top insulating plate with its guiding function, reducing the safety hazard in case of thermal runaway of the cell. In addition, for the remaining heat in the cell with thermal runaway, part of the remaining heat will be rapidly exported through the radiator frame, reducing the housing temperature of the cell with thermal runaway. At the same time, because to the adjacent cell units are provided with heat insulating sheet, the left part of the remaining heat of the cell with thermal runaway will be conducted to the adjacent cell units slowly. After thermal equilibrium, the temperature of the cells of the adjacent cell unit are close to but does not reach the trigger threshold of thermal runaway, and therefore thermal spread is suppressed.

BRIEF DESCRIPTION OF THE DRAWINGS

Hereinafter, some specific embodiments of the present application will be described in detail by way of example but not a limitation with reference to the accompanying drawings. The same reference signs in the figures designate the same or similar parts or components. It will be understood by those skilled in the art that the drawings are not necessarily to scale. In the accompanying drawings.

Figure 1:
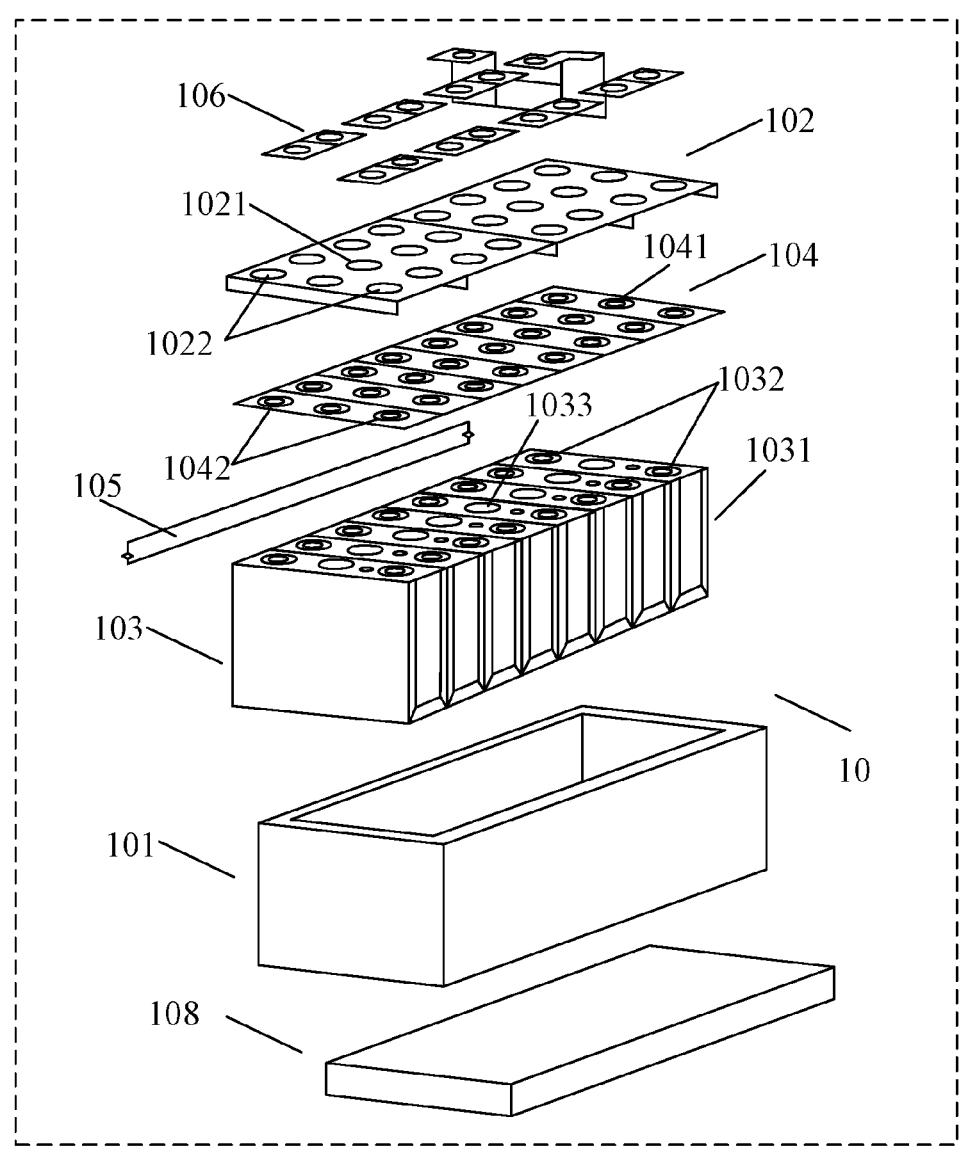
FIG. 1 shows a schematic structure of a battery assembly of an embodiment of the present application.

| Reference signs: | |
|---|---|
| battery assembly 10 | thermal insulating and fastening frame 101 |
| top insulating plate 102 | cell 103 |
| cell body 1031 | electrode 1032 |
| cell pressure relief valve 1033 | first fume passage 1021 |
| first electrode through-hole 1022 | top shielding plate 104 |
| second fume passage 1041 | second electrode through-hole 1042 |
| fume-insulating strip 105 | electrical connecting sheet 106 |
| thermal insulating sheet 107 | base plate 108 |
| battery module 20 | radiator frame 201 |
| radiator fin 2011 | battery energy storage device 30 |
| housing 301 | fume insulating and guiding plate 302 |
| third fume passage 303 | outer hole 3031 |
| inner hole 3032 | connecting channel 3033 |
| top cover 3011 | bottom cover 3012 |
| first side beam 3013 | second side beam 3014 |
| pressure relief hole 30111 | trim plate 304 |

DETAILED DESCRIPTION

Implementations of any technical solution of the embodiments of the present application does not necessarily need to achieve all the above advantages at the same time.

In order to make those skilled in the art better understand the technical solutions in the embodiments of the present application, the technical solutions in the embodiments of the present application will be described clearly and completely below with the accompanying drawings. The described embodiments are only part of the embodiments of the present application, rather than all the embodiments of the present application. All other embodiments obtained by skilled in the art based on the embodiments of the present application should fall within the protection scope of the present application.

Specific embodiments of the present application are further described below in conjunction with the drawings accompanying the embodiments of the present application.

Example I

FIG. 1 is a schematic view of the structure of a battery assembly of an embodiment of the present application. As shown in FIG. 1, the battery assembly 10 comprises: a thermal insulating and fastening frame 101, a top insulating plate 102, and at least one cell 103;

the thermal insulating and fastening frame 101 surrounding the at least one cell 103 to fasten the position of the at least one cell 103;

The cell 103 comprising a cell body 1031, an electrode 1032, and a cell pressure relief valve 1033, the cell pressure relief valve 1033 being used to discharge fume;

a top insulating plate 102 being mounted on the top of the thermal insulating and fastening frame 101 and fitting to the top of the thermal insulating and fastening frame 101, the top insulating plate 102 being provided with at least one first fume passage 1021, the first fume passage 1021 being used to discharge fume, the position of the first fume passage 1021 being opposite to the position of the cell pressure relief valve 1033; the top insulating plate 102 being provided with at least one first electrode through-hole 1022 thereon such that the electrode 1032 is electrically connected through the first electrode through-hole 1022.

In the present application, the electrode 1032 and the cell pressure relief valve 1033 are located on the top of the cell 103, and the top of the cell 103 is located on the top of the battery assembly 10.

In the case that thermal runaway occurs in the cell 103, fume in the cell 103 can be discharged through the cell pressure relief valve 1033, and with the top insulating plate 102 fitting to the top of the cell 103 and the first fume passage 1021 being positioned opposite to the cell pressure relief valve 1033, the fume discharged from the cell pressure relief valve 1033 is therefore directly discharged through the top insulating plate 102 and does not enter the other cells 103, effectively slowing down the spread of the thermal runaway.

Optionally, in an embodiment of the present application, the top insulating plate 102 is provided with at least one convex rib facing towards the thermal insulating and fastening frame 101, insulating the tops of the adjacent cells 103 from each other.

Since the top insulating plate is provided with a convex rib, it is possible to achieve a close fit of the cell 103 at the convex rib, such that the tops of the cells 103 are insulated from each other by the convex rib. It is to be noted that the convex rib may be grid-like according to the arrangement of the cell 103.

Optionally, in an embodiment of the present application, as shown in FIG. 1, the battery assembly 10 further comprises a top shielding plate 104. The top shielding plate 104 is mounted on the top of the thermal insulating and fastening frame 101. The top shielding plate 104 is provided with at least one second fume passage 1041, the second fume passage 1041 being used to discharge fume. The position of the second fume passage 1041 is opposite to the first fume passage 1021. The top shielding plate 104 is fitted to the top of the cell 103. The top insulating plate 102 is fitted to the top shielding plate 104. The top shielding plate 104 is provided with at least one second electrode through-hole 1042 such that the electrode 1032 is electrically connected through the second electrode through-hole 1042.

The top shielding plate 104 can cover the part of the top surface of the cell 103 except for the cell pressure relief valve 1033 and the electrode 1032. The addition of the top shielding plate 104 between the top insulating plate 102 and the cell 103 results in tighter fit between the top insulating plate 102 and the cell 103. In this way, the fume can pass through the cell pressure relief valve 1033, through the second fume passage 1041 and the first fume passage 1021 and then be discharged. This further ensures that the fume will not spread to the other cells 103 through the gap between the top insulating plate 102 and the cell 103.

Optionally, in an embodiment of the present application, the battery assembly 10 further comprises a fume-insulating strip 105, which is mounted on the side face of the battery assembly 10.

Figure 2:
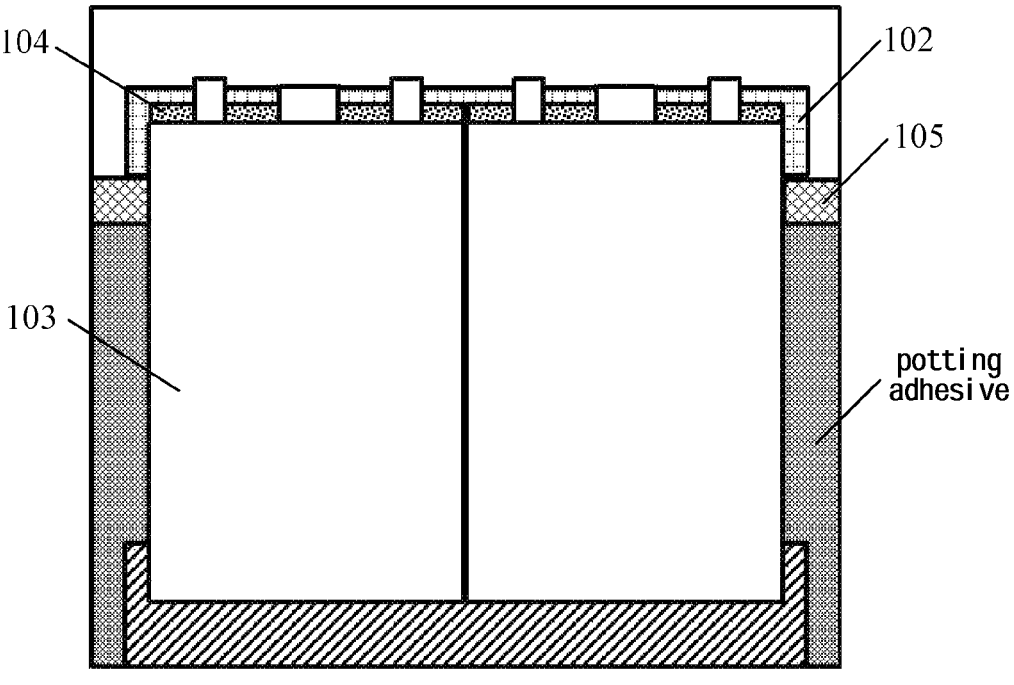
FIG. 2 shows a cross-sectional view of a battery assembly of an embodiment of the present application.

The fume-insulating strip 105 is provided on the side wall of the battery assembly 10, with the fume-insulating strip 105 overfitting within the gap of the side face of the battery assembly 10. Optionally, as shown in FIG. 2, a cross-sectional view of a battery assembly of an embodiment of the present application, the space enclosed by the fume-insulating strip 105, the side face of the battery assembly 10, and the thermal insulating and fastening frame 101 is filled with a potting adhesive to reduce thermal spread of the battery assembly 10.

Optionally, in an embodiment of the present application, as shown in FIG. 1, the battery assembly 10 further comprises an electrical connecting sheet 106, which is mounted above the top insulating plate 102, and the electrodes 1032 of the cells 103 are electrically connected through the electrical connecting sheet 106. Optionally, the electrical connecting sheets 106 between the cells 103 may be integrated in the top insulating plate 102.

Figure 3:
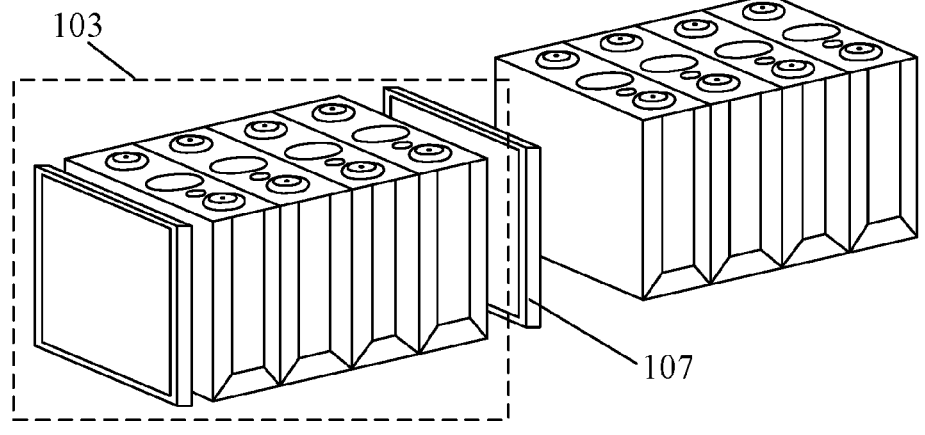
FIG. 3 shows a schematic view of a battery assembly of an embodiment of the present application.

Optionally, in an embodiment of the present application, as shown in FIG. 3, a schematic view of a battery assembly of an embodiment of the present application, the battery assembly 10 further comprises at least one thermal insulating sheet 107, the thermal insulating sheet 107 being provided between the side walls of the cells 103.

The thickness of the heat insulating sheet 107 may be 1 to 4 mm. It is to be noted that one heat insulating sheet 107 may be provided between every two adjacent side walls of the cells 103, or a plurality of cells 103 may be provided as one cell unit with one heat insulating sheet 107 between every two adjacent cell units. In the case that thermal runaway occurs in the cell 103, heat of the cell 103 is dissipated through the heat insulating sheet 107, which will not cause adjacent cells 103 to rapidly heat up and thus will not lead to thermal spread, further reducing the safety hazard of thermal runaway.

Optionally, as shown in FIG. 3; a plurality of cells 103 form a cell unit with heat insulating sheet 107 provided between adjacent cell units. In this battery assembly 10, the cell units are stacked along the normal direction of the side faces of the cells 103 such that one battery assembly 10 may comprise a plurality of cells.

Optionally, of the four side faces of the cell 103 the side face with the larger area being seen as the first side and the side face with the smaller area being seen as the second side, the stacking direction of the cells 103 may be along a direction perpendicular to the second side face of the cells 103 such that the number of cells 103 stacked along a direction vertical of the first side face of the cells 103 in the battery storage system is less than the number of cells 103 stacked along a direction vertical to the second side face of the cells 103. Since the first side face is the main heat transfer surface between the battery units, the amount of heat conduction of the first side face will be higher than that of the second side face. However, because the number of cells 103 stacked in the direction vertical to the first side face is relatively less, the heat spread in the direction vertical to the first side face may also destroy fewer cells 103, causing limited harm to the battery energy storage system.

Optionally, the top insulating plate 102 may be provided with a convex rib at the position corresponding to the heat insulating sheet 107. The heat insulating sheet 107 matches the convex rib of the top insulating plate 102, and the top insulating plate 102 achieves a close fit with the heat insulating sheet 107 with the convex rib.

Optionally, in an embodiment of the present application, as shown in FIG. 1, the battery assembly 10 further comprises a base plate 108, which is provided at the bottom of the battery assembly 10, and the base plate 108 is fixedly connected to the thermal insulating and fastening frame 101 to form a cavity to accommodate at least one cell 103.

It is to be noted that the base plate 108 can conduct heat. In the case that thermal runaway occurs in the cell 103, the heat is quickly exported through the base plate 108 and dispersed to other cells 103 located farther away, or the heat is discharged such that the cell 103 with thermal runaway cools down quickly, also ensuring thermal balance between cells 103 inside the battery assembly 10 to avoid thermal runaway spreading. The safety hazard of thermal runaway is further reduced.

If thermal runaway occurs, the battery assembly 10 can insulate the high temperature ejecta (e.g., fume) from the cells 103.

Figure 4A:
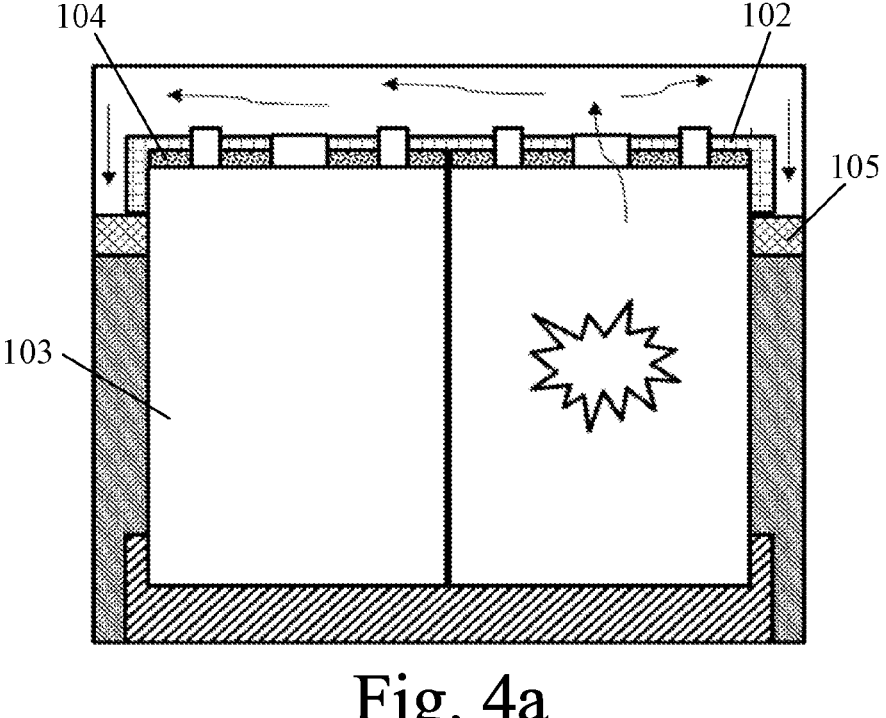
FIG. 4a shows a schematic view of a thermal runaway effect of an embodiment of the present application.

FIG. 4a is a schematic view of a thermal runaway effect provided in an embodiment of the present application. When the high temperature ejecta is ejected from the cell pressure relief valve 1033 on the top surface of the cell 103, it is discharged from the battery assembly 10 through the second fume passage 1041 of the top shielding plate 104, and the first fume passage 1021 of the top insulating plate 102, without passing through the top insulating plate 102 or the side plate of the battery assembly 10 to return to the internal of the battery assembly 10.

Figure 4B:
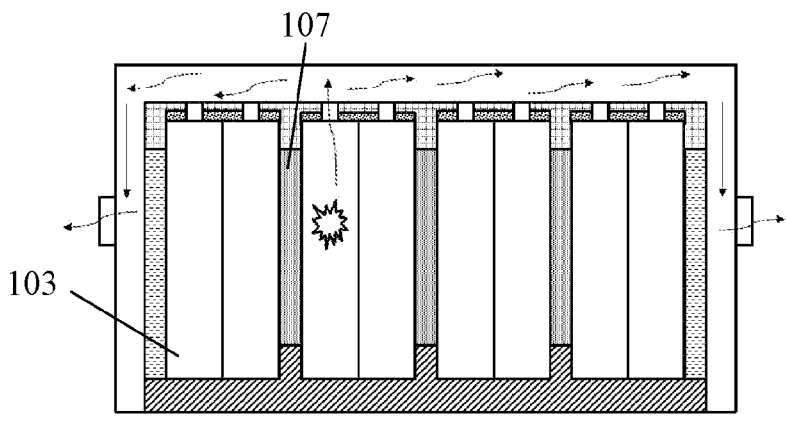
FIG. 4b shows a schematic view of a thermal runaway effect of an embodiment of the present application.

FIG. 4b is a schematic view of a thermal runaway effect of an embodiment of the present application. when the side face of the cell 103 that triggers thermal runaway breaks, high temperature ejecta is ejected from the side face of the cell 103. Since the two adjacent cell units are separated into two relatively independent spaces, the high-temperature ejecta from the side face is unable to reach the adjacent cell unit. In addition, if the structure of the top insulating plate 102 is deformed under the thermal influence of the high-temperature ejecta, such that it is slightly bulged along the direction perpendicular to the top surface of the cell 103 outside from the cell 103, the top protection plate 104 can still provide good thermal insulating protection for the cell 103. Also, since the top insulating plate 102 is provided with a convex rib facing the cell 103, the adjacent cell units remain two spaces insulated from each other, preventing the high temperature ejecta from transferring from one cell unit to the adjacent cell unit in the gap between the bulged and deformed top insulating plate 102 and the cover plate.

For the battery assembly of embodiments of the present application, with the top insulating plate provided in the battery assembly, in case of a thermal runaway, the fume in the cell, after being discharged from the cell through the cell pressure relief valve on the cell, cannot enter other cells due to the top insulating plate and is discharged through the top insulating plate with its guiding function, reducing the safety hazard in case of thermal runaway of the cell. In addition, the heat-conducting base plate transfers part of the heat from the cell with thermal runaway to other places in time, deferring the time of thermal spread of the cell with thermal runaway to the adjacent cells.

Example II

Figure 5A:
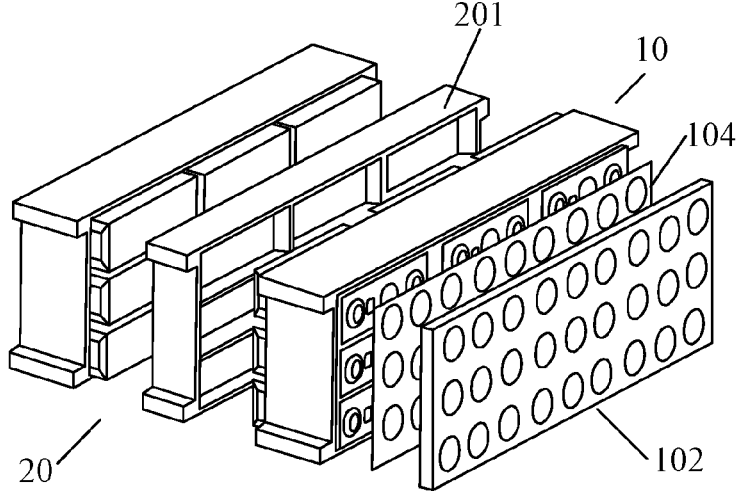
FIG. 5a shows a structure of a battery module of an embodiment of the present application.

Based on the battery assembly 10 described in Example I above, embodiments of the present application provide a battery module 20, as shown in FIG. 5a. FIG. 5a is a structural view of a battery module provided in an embodiment of the present application. The battery module 20 comprises at least one battery assembly 10, the battery assembly 10 being the battery assembly 10 described in Example I of the present application.

The battery module 20 further comprises a radiator frame 201, the radiator frame 201 being mounted with a single side, or at least one battery assembly 10 being mounted on each side of the radiator frame 201 such that the battery assembly 10 dissipates heat through the radiator frame, the bottom face of the battery assembly being provided opposite to the radiator frame, and the bottom face of the cell of the battery assembly being fitted to the radiator frame.

Optionally, in an embodiment of the present application, the radiator frame 201 is provided with a convex rib at a position corresponding to the thermal insulating and fastening frame 101, and the convex rib of the radiator frame 201 fits to or leaves a gap with the lower edge of the thermal insulating and fastening frame 101.

Optionally, in an embodiment of the present application, the radiator frame 201 is provided with a cooling runner inside the radiator frame 201, and the cooling runner is configured to accommodate a coolant. Preferably, the coolant can circulate in the cooling runner, enhancing the cooling effect of the radiator frame 201.

Figure 5B:
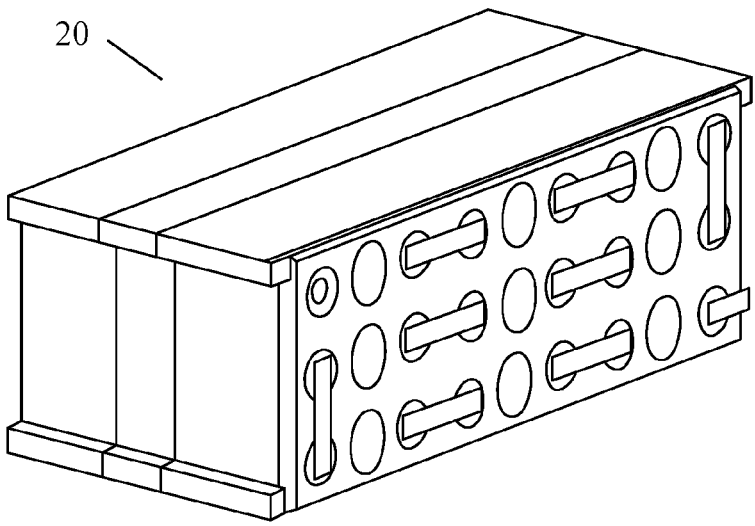
FIG. 5b shows a three-dimensional view of a battery module of an embodiment of the present application.

The radiator frame 201 may be provided between two battery assemblies 10. The radiator frame 201 is provided with a recess for securing the battery assemblies 10. The bottoms of the battery assemblies 10 is opposite to the radiator frame 201, and the radiator frame 201 fits against the battery assemblies 10 to enable the battery assemblies 10 to dissipate heat through the radiator frame 201. The top and bottom of the battery module 20 are identical because the bottoms of two battery assemblies 10 are opposite to each other such that the top and bottom of the battery module 20 are configured as both the top of the battery assembly 10 (i.e., the part where the cell pressure relief valves 1033 and electrodes 1032 are located) as shown in FIG. 5b, which is a three-dimensional view of a battery module of an embodiment of the present application.

Figure 5C:
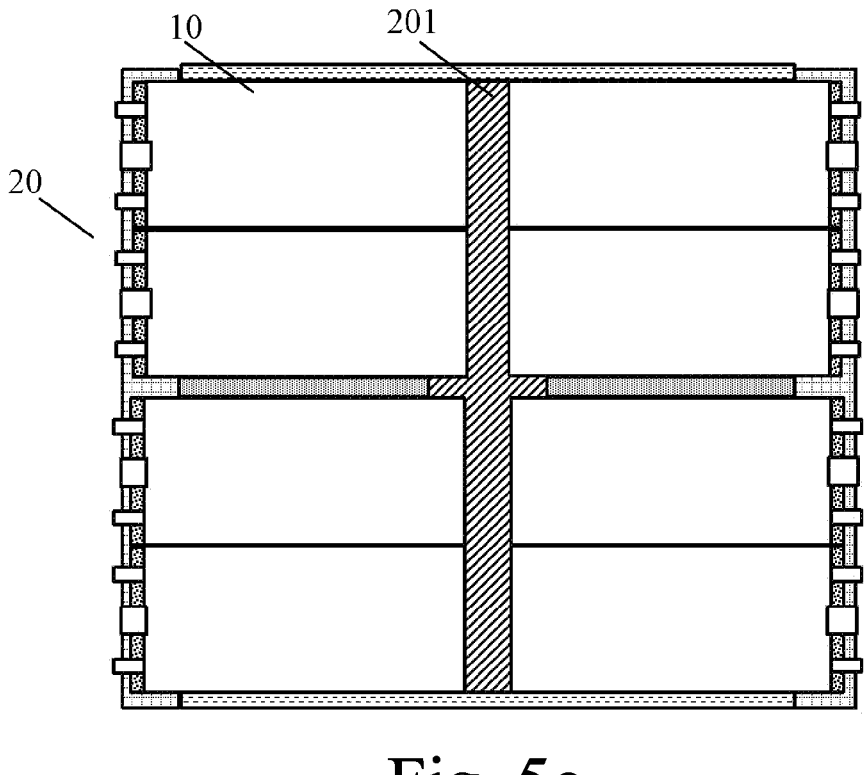
FIG. 5c shows a cross-sectional view of a battery module of an embodiment of the present application.

FIG. 5c is a cross-sectional view of a battery module provided in an embodiment of the present application, with battery assemblies 10 arranged symmetrically on each side of the radiator frame 201 such that the bottom face of the cell 103 on one side of the radiator frame 201 is set opposite to the bottom face of the cell 103 on the other side of the radiator frame 201 and each cell is mounted on each side of one radiator frame 201 such that the battery assemblies 10 are substantially symmetrical along the radiator frame 201.

The side of the cell 103 in contact with the radiator frame 201 is the radiating surface. Optionally, coating heat conductive adhesive between the cell 103 and the radiator frame 201 will cause the contact thermal resistance of the radiating surface lower and more conducive to heat dissipation of the cell 103.

The radiator frame 201 may also be provided with a cooling channel within the radiator frame 201, and the cooling channel accommodates a coolant. The radiator frame 201 can further enhance the heat dissipation effect of the cell 103 with the coolant.

Figure 6:
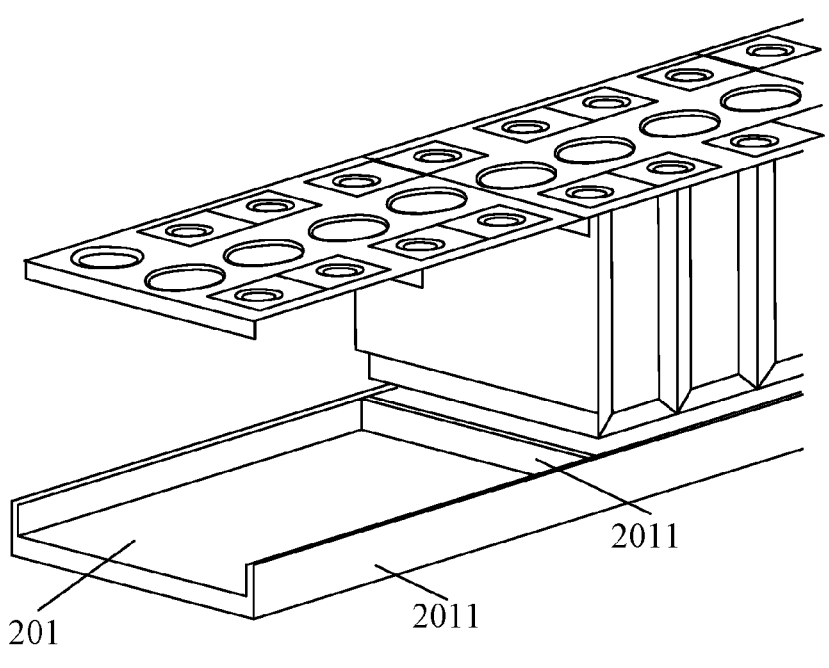
FIG. 6 shows a schematic view of a radiator frame of an embodiment of the present application.

Optionally, as shown in FIG. 6, a schematic view of a radiator frame provided in an embodiment of the present application, the radiator frame 201 further comprises a radiator fin 2011. The radiator fin 2011 abuts the side face of the battery assembly 10 along the edge of the radiator frame 201. The thickness of the radiator fin 2011 may be 2-5 mm.

The radiator fin 2011 further increases the thermal radiating area from the cell 103 to the radiator frame 201 and improve the radiating performance.

Further, optionally, as shown in FIG. 6, at the location of the insulating sheet 107 between adjacent cell units, the radiator frame 201 extends to form radiator fins 2011 between the cells 103 in a direction perpendicular to the radiating surface of the cell unit. The end faces of the radiator fins 2011 between the cells 103 are in close proximity to the insulating sheet 107. The thickness of the radiator fins 2011 between the cells 103 may be 2-5 mm.

Referring the total area of the thermal radiating surface of all cells 103 and the radiator frame 201 in each cell unit as A, and the total volume of all the cells 103 in each cell unit as V, if the ratio A/V is greater than or equal to 10, sufficient thermal radiating amount of the cells 103 after thermal runaway will be ensured. The radiator frame 201 is made of a material with high thermal conductivity, preferably an aluminum alloy.

In the event of a thermal runaway, the temperature of cell 103 with thermal runaway will rise abruptly, and most of its heat is carried away from the cell 103 through its high temperature ejecta. For the remaining heat in the cell 103 with thermal runaway, part of the remaining heat will be rapidly exported through the radiator frame 201, reducing the housing temperature of the cell 103 with thermal runaway. At the same time, because to the adjacent cell units are provided with heat insulating sheet 107 between them, the left part of the remaining heat of the cell 103 with thermal runaway will be conducted to the adjacent cell units. After thermal equilibrium, the temperature of the cells 103 of the adjacent cell unit are close to but does not reach the trigger threshold of thermal runaway, and therefore thermal spread is suppressed.

For the battery module of embodiments of the present application, due to radiator frame being provided between battery assemblies, in case of thermal runaway, the heat of cells is rapidly exported through the radiator frame, which reduces the temperature of the cell with thermal runaway and conducts the heat to the adjacent cells, reducing the safety hazard in case of thermal runaway of the cell.

Example III

Figure 7:
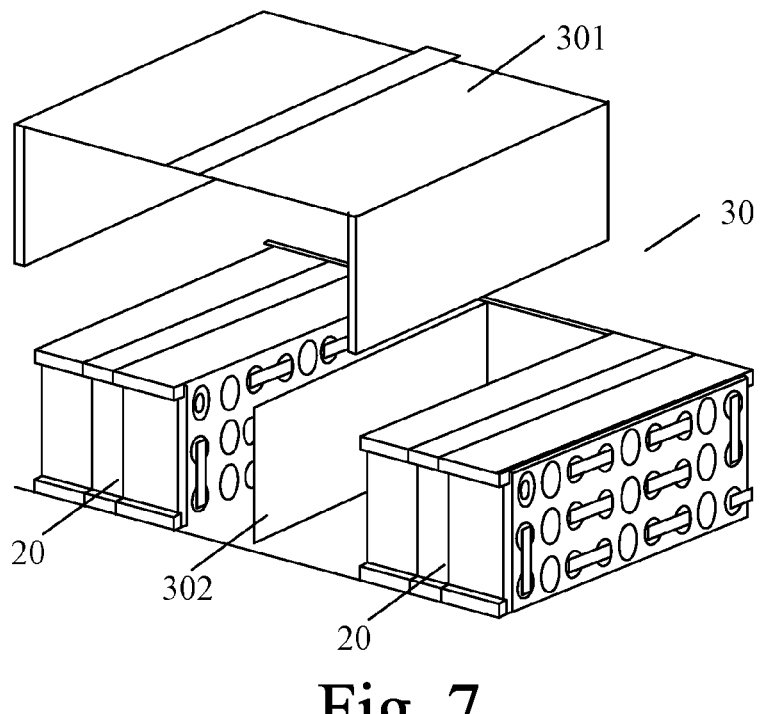
FIG. 7 shows a structural view of a battery energy storage device of an embodiment of the present application.

Based on the battery assembly 10 described in Example I and the battery module 20 described in Example II above, embodiments of the present application provide a battery energy storage device 30, as shown in FIG. 7, a structural view of a battery energy storage device of an embodiment of the present application. The battery energy storage device 30 comprises at least one battery module 20, the battery module 20 being the battery module 20 described in Example II.

Optionally, in an embodiment of the present application, the battery energy storage device 30 further comprises a housing 301 and a fume insulating and guiding plate 302, as shown in FIG. 7.

Figure 8:
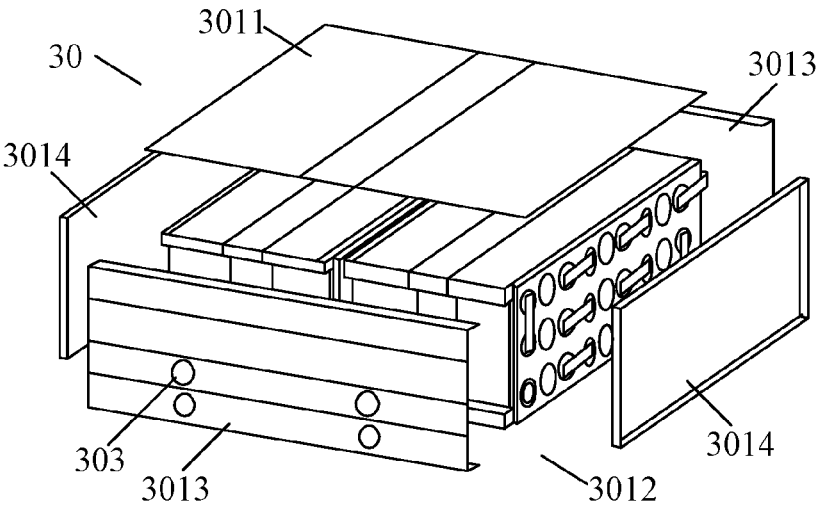
FIG. 8 shows a structural view of a battery energy storage device of an embodiment of the present application.

As shown in FIG. 8, a structural view of a battery energy storage device of an embodiment of the present application, the housing 301 is provided with a third fume passage 303. The fume insulating and guiding plate 302 is provided between two battery modules 20. The tops of the two battery modules 20 face the fume insulating and guiding plate 302 and each leaves a gap to the fume insulating and guiding plate 302, in order to allow fume to pass through the first fume passage 1021 through the top insulating plate 102 of the battery modules 20 and exits through the third fume passage 303 along the fume insulating and guiding plate 302.

Figures 9, 10:
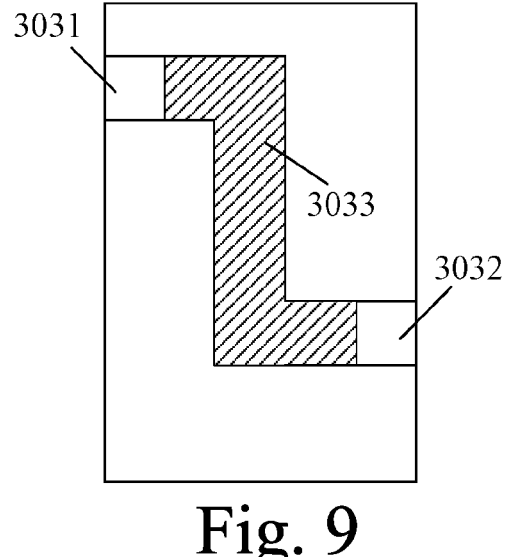
FIG. 9 shows a cross-sectional view of a housing of an embodiment of the present application.
FIG. 10 shows a structural view of a battery energy storage device of an embodiment of the present application.

Optionally, in an embodiment of the present application, as shown in FIG. 9, which provides a cross-sectional view of a housing, the third fume passage 303 comprises an outer hole 3031, an inner hole 3032, and a connecting channel 3033. The inner hole 3032 is provided in the inner wall of the housing 301, the outer hole 3031 is provided in the outer wall, and the inner hole 3032 is connected to the outer hole 3031 through the connecting channel 3033. The position of the inner hole 3032 is displaced to the position of the outer hole 3031 to increase the distance of the connecting channel 3033 such that the high temperature fume is fully cooled in the connecting channel 3033.

Optionally, a fume filter (not shown in the figures) may be provided at the inner hole 3032 and a pressure relief valve (not shown in the figures) may be installed at the outer hole 3031. The fume filter provided at the inner hole 3032 will cause the fume discharged from the battery energy storage device 30 clearer and prevent air pollution. The fume filter provided at the inner hole 3032 may also include chemicals that is able to reduce toxic substances in the fume from causing harm to people in the vicinity.

Optionally, as shown in FIG. 8, the housing 301 comprises a top cover 3011, a bottom cover 3012, two first side beams 3013, and two second side beams 3014, The top cover 3011, the bottom cover 3012, the two first side beams 3013, and the two second side beams 3014 are fixedly connected together to form a cavity accommodating at least one battery module 20.

Optionally, in an embodiment of the present application, the top cover 3011 and the bottom cover 3012 are opposite to two first sides of the battery module 20, respectively; the first side beams 3013 and the second side beams 3014 are opposite to two second sides of the battery module 20, respectively, the first side having an area larger than the second side; and the second side beams 3014 are opposite to the bottom of the battery module 20, respectively.

The third fume passage 303 may be provided on the first side beam 3013 or on the second side beam, which is not limited by the present application.

Optionally, in an embodiment of the present application, as shown in FIG. 10, which shows a structural view of a battery energy storage device of an embodiment of the present application, the top cover 3011 is provided with at least one pressure relief hole 30111.

Optionally, in an embodiment of the present application, the battery energy storage device 30 further comprises a trim plate 304, the trim plate 304 being fixed to the top cover 3011 in a position opposite to the at least one pressure relief hole 30111.

The pressure relief holes 30111 may assist in relieving pressure during high temperature relief. The pressure relief holes 30111 may be provided only on the top cover 3011 for fume discharge, or on the bottom cover 3012 for fume discharge, or on both the top cover 3011 and the bottom cover 3012 for fume discharge, according to specific scenario, which is not limited by embodiments of the present application.

Figure 11:
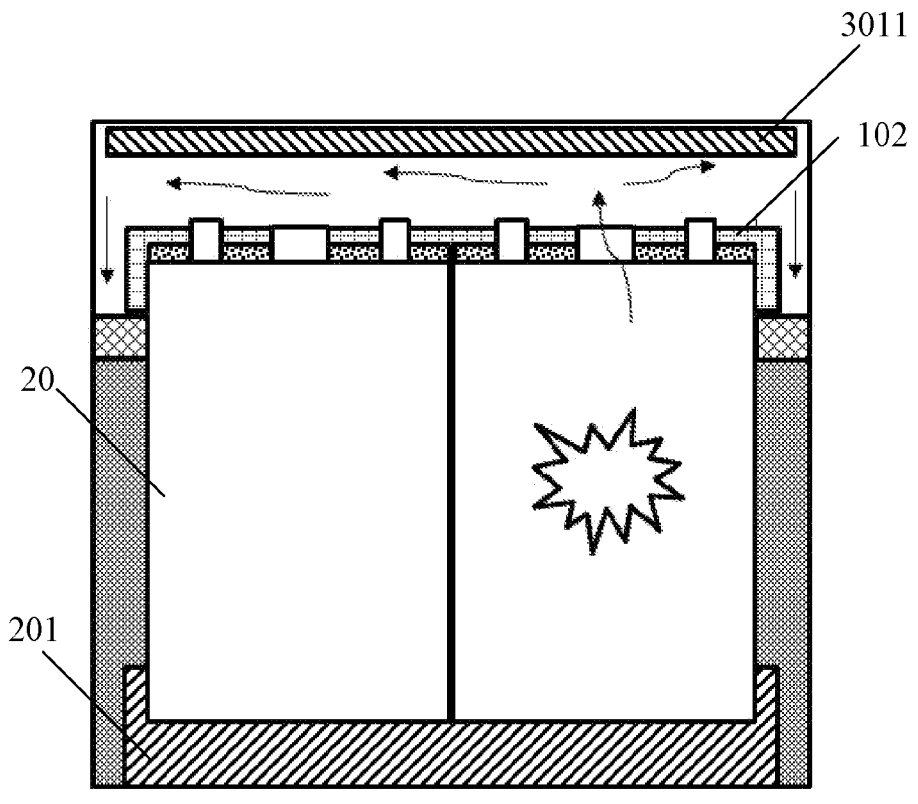
FIG. 11 shows a cross-sectional view of a battery energy storage device of an embodiment of the present application.

FIG. 11 provides a cross-sectional view of a battery energy storage device of an embodiment of the present application. As shown in FIG. 11, the battery energy storage device 30 comprises a battery module 20. the top insulating plate 102 of the battery module 20 is provided opposite to the top cover 3011 of the housing 301, with a gap therebetween. Optionally, a thermal protection layer may be provided between the top cover 3011 of the housing 301 and the battery module 20 to avoid high temperature ejecta of the battery module 20 from melting through the top cover 3011 of the housing 301 in case of a thermal runaway. The second side beam 3014 is provided with a third fume passage 303, and a pressure relief valve may be provided on the third fume passage 303. In case of thermal runaway, high temperature ejecta is ejected through the first fume passage 1021 of the battery module 20, and reflected on the top cover 3011 of the housing 301, and then passes through the circulating space and is discharged from the battery energy storage device 30 through the third fume passage 303 of the second side beam 3014 such that the high temperature ejecta is fully cooled down and spark jets are blocked, effectively avoiding fire ejecting.

Figure 12:
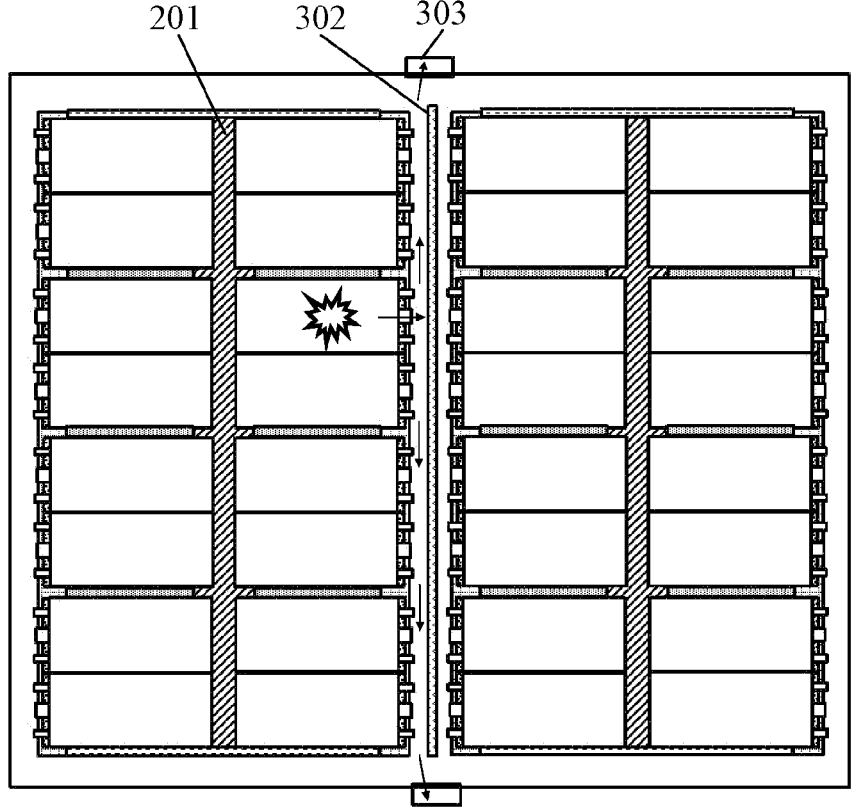

FIG. 12 shows a cross-sectional view of a battery energy storage device provided in an embodiment of the present application. As shown in FIG. 12, the battery energy storage device 30 comprises two battery modules 20. The top insulating plate 102 of the battery modules 20 is set parallel to the first side beam 3013 of the housing 301. A third fume passage 303 is provided on the second side beam 3014 of the housing 301. The top insulating plates 102 of adjacent battery modules 20 are set opposite to each other and have a gap therebetween. Between the facing ends of the two adjacent battery modules 20 is a pressure relief channel. A fume insulating and guiding plate 302 is fixed between the two battery modules 20. The fume insulating and guiding plate 302 separates the gap between the two battery modules 20 along a line perpendicular to the top insulating plate 102 into two circulating spaces. The two circulating spaces are set corresponding to the two adjacent battery modules 20 respectively. Each circulating space is connected to the pressure relief channel of the adjacent battery module 20, and are connected to both the third fume passage 303 set on the second side beam 3014 and the pressure relief valve. After the thermal runaway of the cell 103 occurs, high temperature ejecta is sprayed to the fume insulating and guiding plate 302 through the first fume passage 1021 of the battery module 20. After being reflected, it then reaches the third fume passage 303 through the circulating space, and finally discharges from the battery energy storage device 30 through the relief valve such that the high temperature ejecta is fully cooled down and the spark jet is blocked, effectively avoiding fire ejecting.

The battery energy storage device of embodiments of the present application comprises the fume insulating and guiding plate and the housing. Since a top insulating plate is provided in the battery assembly, in case of a thermal runaway, after the fume in the cell is discharged from the cell through the pressure relief valve on the cell, the fume cannot enter other cells due to the top insulating plate, but circulates to the third fume passage on the housing through the fume insulating and guiding plate, and them be discharged. This reduces the safety hazard when the cell is in a thermal runaway.

The above product can execute the method provided by embodiments of the present application, and has corresponding functional modules and beneficial effects for executing the method. For technical details not described in detail in this embodiment, reference may be made to the methods provided in the embodiments of this application.

It should be noted that in this specification, similar sings and letters denote similar items in the accompanying drawings, such that once an item is defined in one accompanying drawing, no further definition and explanation thereof is required in subsequent accompanying drawings.

When describing embodiments of the present application, it is noted that the terms "top", "below", "inside", "bottom" and the like indicate orientation or positional relationships based on the orientations or positional relationships shown in the accompanying drawings, or the orientations or positional relationships in which the product of the disclosure is customarily placed in use, solely for the purpose of facilitating and simplifying the description, but not indicating or implying that the device or element mentioned only has a particular orientation, and/or being constructed or operated in a particular orientation, and therefore are not to be construed as a limitation of the invention.

The terms "first", "second", and the like are used only for description purpose but not indicating or implying relative importance, order, and/or necessity, etc.

In the description of embodiments of the present application, it is also noted that, unless otherwise expressly specified or limited, the terms "set," "interconnect," and "connect" and their variant are to be understood in a broad sense. For example, it may be a fixed connection, a removable connection, or a one-piece connection; it may be a mechanical connection or an electrical connection; it may be a direct connection or an indirect connection through an intermediate medium; and it can be a connection within two components. For a skilled person in the art, the specific meaning of the above terms in embodiments of the present application can be understood in specific cases.

It should also be noted that the terms "comprising", "including" or any other variant thereof are intended to encompass non-exclusive inclusion, such that a process, method, product or device comprises a series of elements includes not only those mentioned elements, but also other elements that are not expressly listed or inherent to such a process, method, product or device. Without further limitation, an element qualified by the phrase "comprising a . . . " does not preclude the presence of additional identical elements in the process, method, product or device that includes the element.

Each embodiment in this specification is described in a progressive manner. The same or similar parts between the various embodiments can be referred to each other, and each embodiment focuses on the differences from others. In particular, for system embodiments, since they are basically similar to the method embodiments, the description is relatively brief, and for related parts, please refer to the partial descriptions of the method embodiments.

The above shows only embodiments of the present application, but not intends to limit the present application. Various modifications and variations of this application are possible for those skilled in the art. Any modifications, equivalent replacements, improvements, etc. made within the spirit and principle of this application should be included within the scope of the claims of this application.

The invention claimed is:

1. A battery assembly comprising a one-piece thermal insulating and fastening frame, a top insulating plate, and stacked cells, the one-piece thermal insulating and fastening frame surrounding the stacked cells to fix the position of the stacked cells, each cell comprising a cell body, an electrode, and a cell pressure relief valve, the cell pressure relief valve being used to discharge fume, the top insulating plate being mounted on the top of the one-piece thermal insulating and fastening frame, and fitting to the top of the one-piece thermal insulating and fastening frame, the top insulating plate being provided with a first fume passage, the first fume passage being used to discharge fume, the first fume passage being positioned opposite to the position of the cell pressure relief valve;

the top insulating plate being provided with a first electrode through-hole in order that the electrode is electrically connected through the first electrode through-hole;

the battery assembly further comprising a top shielding plate set between the top insulating plate and the cells, the top shielding plate being mounted on the top of the one-piece thermal insulating and fastening frame, the top shielding plate being provided with a second fume passage, the second fume passage being used for discharging fume, the second fume passage being positioned opposite to the first fume passage, the top shielding plate being used such that the top insulating plate is fitted to the cells, fume being discharged through the cell pressure relief valve, passing through the second fume passage and the first fume passage and then being discharged, wherein the top insulating plate is provided with at least one convex rib, the convex rib facing towards the one-piece thermal insulating and fastening frame, the convex rib being closely fitted with the cells such that the tops of each cell is insulated from each other by the convex rib, and wherein the battery assembly further comprises a fume-insulating strip, the fume-insulating strip being provided on a side wall of the battery member, with the fume-insulating strip overfitting within a side gap of the battery member and a space enclosed by a smoke isolation strip, a side of the battery assembly, and the thermal insulating and fastening frame is filled with a potting adhesive to reduce thermal spread of the battery assembly.

2. The battery assembly according to claim 1, wherein the top shielding plate being fitted to the top of the cell, the top insulating plate being fitted to the top shielding plate, the top shielding plate being provided with a second electrode through-hole in order that the electrode is electrically connected through the second electrode through-hole.

3. The battery assembly according to claim 1, wherein each cell has four side faces including a first side face with relatively large area and a second side face with relatively small area, the number of cells in the battery assembly stacked along a direction perpendicular to the first side face being less than that of cells stacked along a direction perpendicular to the second side face, and the first side face being the main thermal radiating face between cells.

4. The battery assembly according to claim 1, wherein the battery assembly further comprises an electrical connecting sheet, the electrical connecting sheet being mounted above the top insulating plate, the electrode of the cell being electrically connected through the electrical connecting sheet.

5. The battery assembly according to claim 1, wherein the battery assembly further comprises at least one thermal insulating sheet, the thermal insulating sheet being provided between the side walls of the cell.

6. The battery assembly according to claim 1, wherein the battery assembly further comprises a base plate, the base plate being provided at the bottom of the battery assembly, the base plate being fixedly connected to the one-piece thermal insulating and fastening frame to form a cavity to accommodate at least one cell.

7. A battery module comprising at least one battery assembly according to claim 1, the battery module further comprising a radiator frame, the radiator frame being mounted with a single side, or at least one battery assembly being mounted on each side of the radiator frame in order that the battery assembly dissipates heat through the radiator frame, the bottom face of the battery assembly being provided opposite to the radiator frame, and the bottom face of the cell of the battery assembly being fitted to the radiator frame;

wherein a plurality of cells in the battery assembly forms one cell unit, and wherein in the case that the total area of all cells in each cell unit being closely fitted with the thermal radiator frame being represented as A and the total volume of all cells in each cell unit being represented as V, A/V being greater or equal to 10 is satisfied to ensure that the cells have sufficient thermal radiating amount after thermal runaway.

8. The battery module according to claim 7, wherein the radiator frame is provided with a convex rib at a position corresponding to the one-piece thermal insulating and fastening frame, and wherein the convex rib of the radiator frame fits to or leaves a gap with the lower edge of the one-piece thermal insulating and fastening frame; and wherein the radiator is further provided with a radiator fin, the radiator fin abuts the side face of the battery assembly along the edge of the radiator frame to increase the thermal radiating area from the cells to the radiator frame.

9. The battery module according to claim 7, wherein the radiator frame is provided with a cooling runner therein, the cooling runner being used to accommodate a coolant.

10. A battery energy storage device comprising at least one battery module according to claim 7.

11. The battery energy storage device according to claim 10, wherein the battery energy storage device further comprises a housing and a fume insulating and guiding plate, the housing being provided with a third fume passage, the fume insulating and guiding plate being provided between two battery modules, the top of the two the battery modules facing towards the fume insulating and guiding plate and having a gap with the fume insulating and guiding plate such that the fume passing through the first fume passage through the top insulating plate of the battery modules and being discharged from the third fume passage along the fume insulating and guiding plate.

12. The battery energy storage device according to claim 11, wherein the third fume passage comprises an outer hole, an inner hole and a connecting channel; the inner hole being provided in the inner wall of the housing, the outer hole being provided in the outer wall of the housing, the position of the inner hole being displaced to the position of the outer hole, the inner hole and the outer hole being connected with each other through the connecting channel; and wherein the inner hole is provided with a fume filter.

13. The battery energy storage device according to claim 10, wherein the housing comprises a top cover, a bottom cover, two first side beams and two second side beams; the top cover, the bottom cover, the two first side beams and the two second side beams being fixedly connected together to form a cavity accommodating at least one battery module.

14. The battery energy storage device according to claim 13, wherein the top cover and the bottom cover are opposed to the two first sides of the battery module respectively; the first side beams and the second side beams being opposed to two second sides of the battery module respectively, the first sides having areas larger than those of the second sides; the second side beams being opposed to the bottom of the battery module respectively.

15. A battery energy storage device comprising at least one battery module according to claim 8.

16. A battery energy storage device comprising at least one battery module according to claim 9.

17. A battery module comprising at least one battery assembly according to claim 2, the battery module further comprising a radiator frame, the radiator frame being mounted with a single side, or at least one battery assembly being mounted on each side of the radiator frame in order that the battery assembly dissipates heat through the radiator frame, the bottom face of the battery assembly being provided opposite to the radiator frame, and the bottom face of the cell of the battery assembly being fitted to the radiator frame;

wherein a plurality of cells in the battery assembly forms one cell unit, and wherein in the case that the total area of all cells in each cell unit being closely fitted with the thermal radiator frame being represented as A and the total volume of all cells in each cell unit being represented as V, A/V being greater or equal to 10 is satisfied to ensure that the cells have sufficient thermal radiating amount after thermal runaway.

18. A battery module comprising at least one battery assembly according to claim 3, the battery module further comprising a radiator frame, the radiator frame being mounted with a single side, or at least one battery assembly being mounted on each side of the radiator frame in order that the battery assembly dissipates heat through the radiator frame, the bottom face of the battery assembly being provided opposite to the radiator frame, and the bottom face of the cell of the battery assembly being fitted to the radiator frame;

wherein a plurality of cells in the battery assembly forms one cell unit, and wherein in the case that the total area of all cells in each cell unit being closely fitted with the thermal radiator frame being represented as A and the total volume of all cells in each cell unit being represented as V, A/V being greater or equal to 10 is satisfied to ensure that the cells have sufficient thermal radiating amount after thermal runaway.

19. A battery module comprising at least one battery assembly according to claim 4, the battery module further comprising a radiator frame, the radiator frame being mounted with a single side, or at least one battery assembly being mounted on each side of the radiator frame in order that the battery assembly dissipates heat through the radiator frame, the bottom face of the battery assembly being provided opposite to the radiator frame, and the bottom face of the cell of the battery assembly being fitted to the radiator frame;

wherein a plurality of cells in the battery assembly forms one cell unit, and wherein in the case that the total area of all cells in each cell unit being closely fitted with the thermal radiator frame being represented as A and the total volume of all cells in each cell unit being represented as V, A/V being greater or equal to 10 is satisfied to ensure that the cells have sufficient thermal radiating amount after thermal runaway.

20. A battery module comprising at least one battery assembly according to claim 5, the battery module further comprising a radiator frame, the radiator frame being mounted with a single side, or at least one battery assembly being mounted on each side of the radiator frame in order that the battery assembly dissipates heat through the radiator frame, the bottom face of the battery assembly being provided opposite to the radiator frame, and the bottom face of the cell of the battery assembly being fitted to the radiator frame;

wherein a plurality of cells in the battery assembly forms one cell unit, and wherein in the case that the total area of all cells in each cell unit being closely fitted with the thermal radiator frame being represented as A and the total volume of all cells in each cell unit being represented as V, A/V being greater or equal to 10 is satisfied to ensure that the cells have sufficient thermal radiating amount after thermal runaway.

\* \* \* \* \*